Aug. 7, 1934.  W. W. McLAURIN  1,969,660
MACHINE FOR APPLYING REENFORCING AND SEALING TAPES
Filed Nov. 14, 1932  5 Sheets-Sheet 2
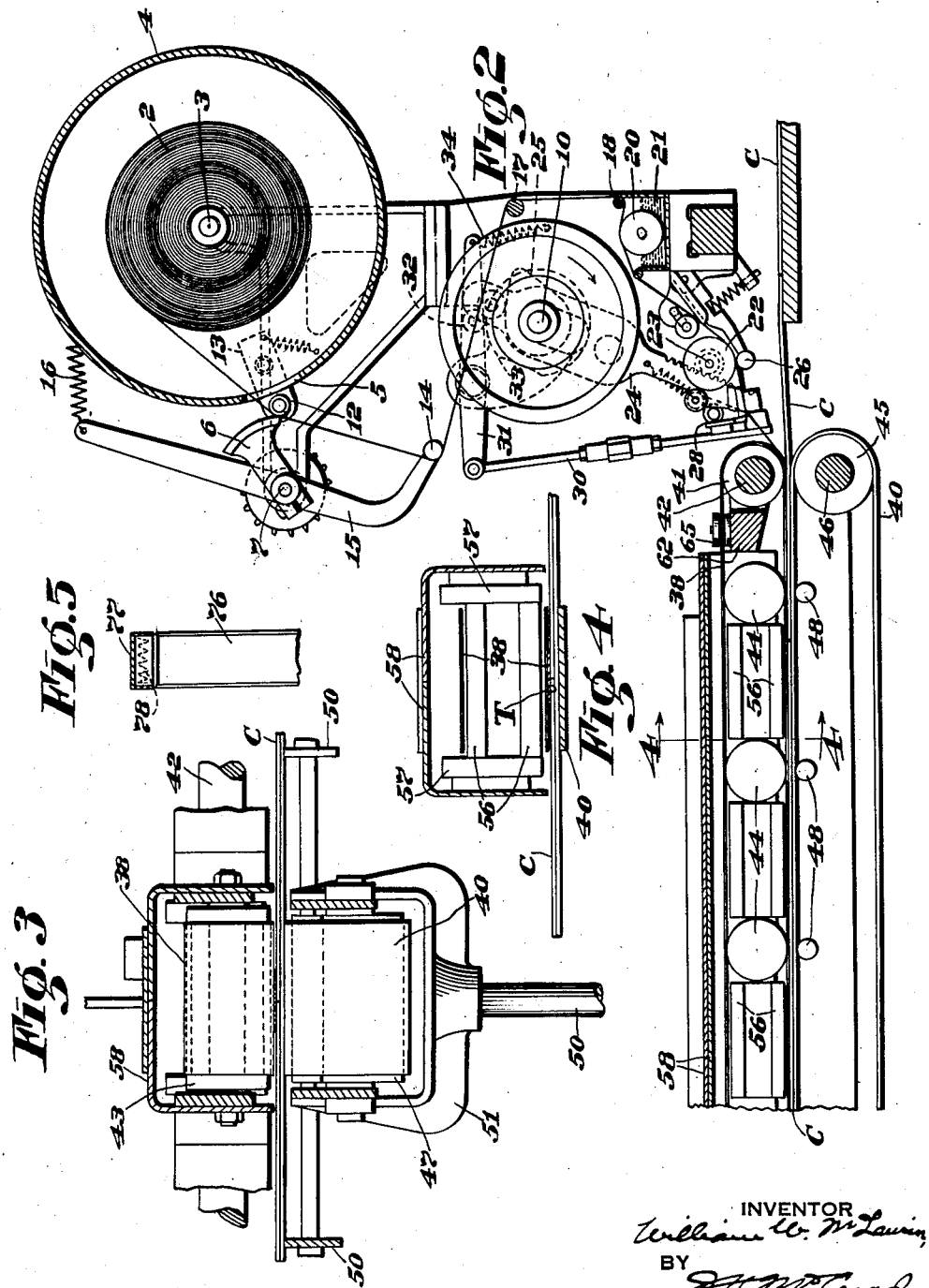

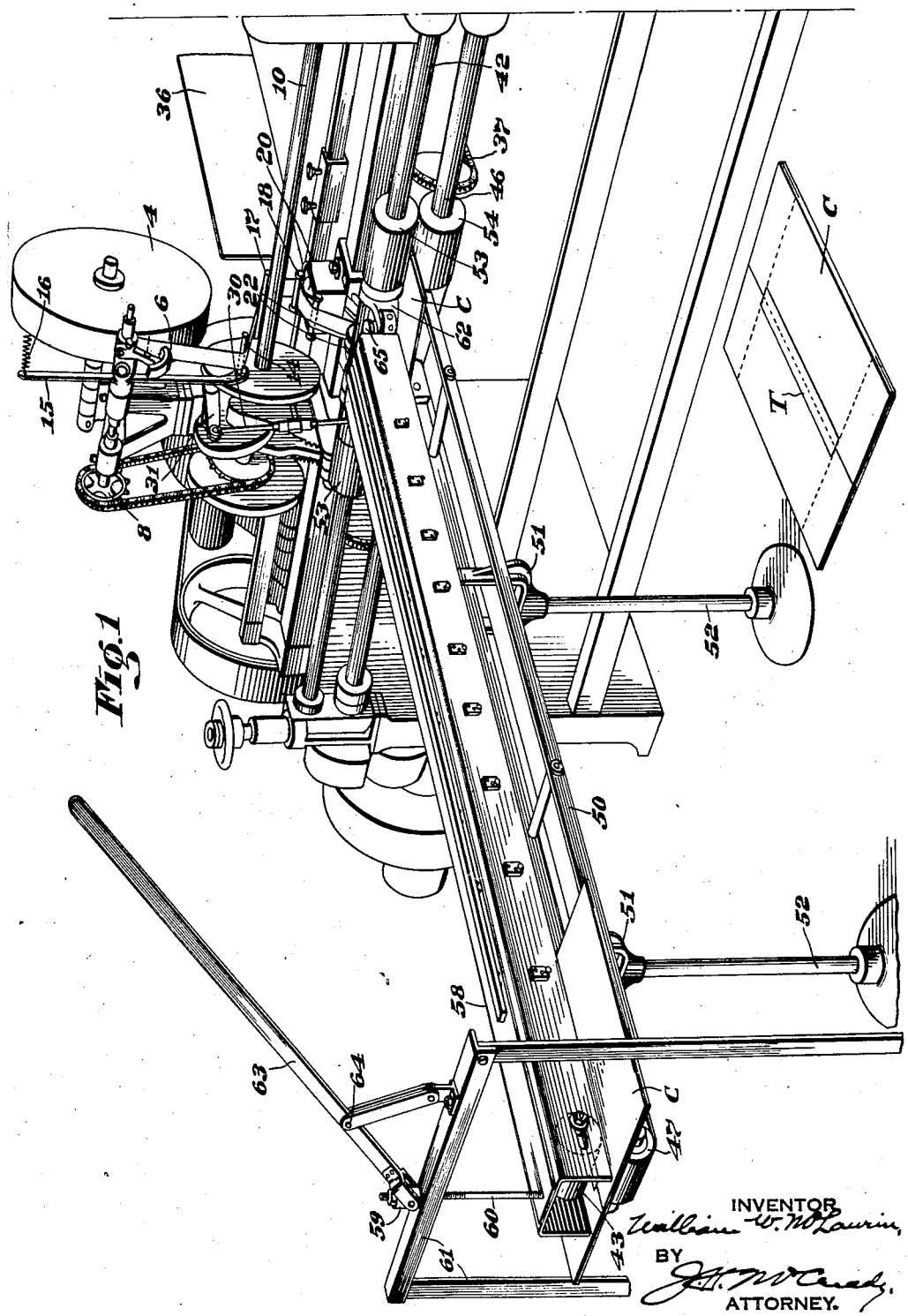

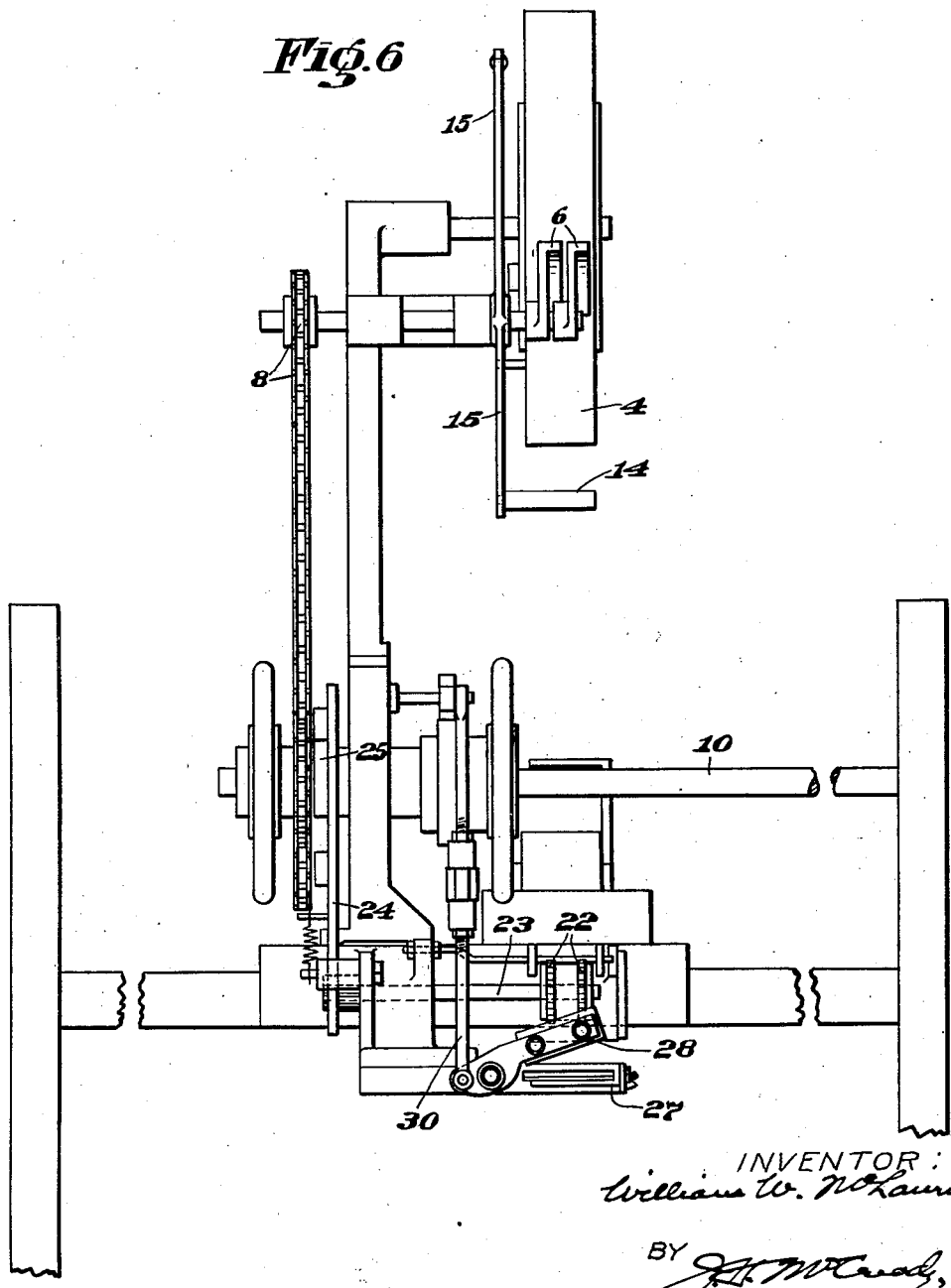

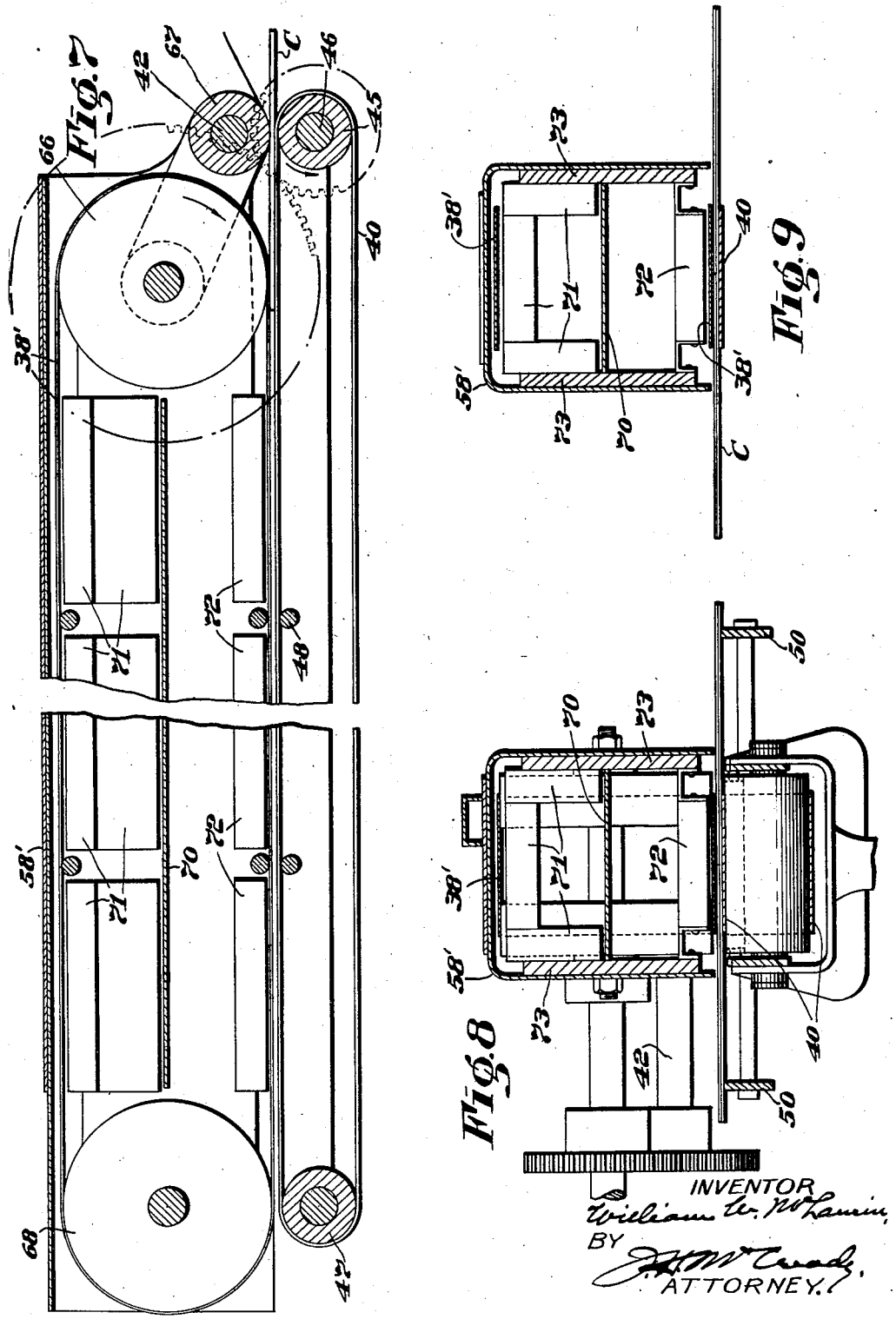

Aug. 7, 1934.　　　W. W. McLAURIN　　　1,969,660
MACHINE FOR APPLYING REENFORCING AND SEALING TAPES
Filed Nov. 14, 1932　　5 Sheets-Sheet 5

INVENTOR
William W. McLaurin
BY
J. H. McCready
ATTORNEY

Patented Aug. 7, 1934

1,969,660

UNITED STATES PATENT OFFICE 1,969,660

MACHINE FOR APPLYING REENFORCING AND SEALING TAPES

William W. McLaurin, Brookfield, Mass.; Old Colony Trust Company executor of said William W. McLaurin, deceased Application November 14, 1932, Serial No. 642,513

12 Claims. (Cl. 93—56)

This invention relates to machines for applying reenforcing and sealing tapes to cartons and other containers or packages hereinafter, for convenience, referred to generically as "cartons".

It is a common practice in making cartons to cut out and score a carton blank, next to fold it into a flattened or "knocked-down" form with two edges in abutting relationship, and then to secure these abutted edges together by means of a strip of adhesively coated reenforcing tape. Also, after a carton has been filled it is customary to fold down the flaps and to secure them in this condition by a similar strip of tape, often referred to as a "sealing tape".

Heretofore it has been customary to use either paper or cloth tapes coated with water soluble adhesive, but considerable complaint has been voiced by the users of the cartons made in this manner because of the tendency of the adhesive to absorb moisture from the atmosphere under certain conditions and to soften up sufficiently to release the tape.

With a view to overcoming this difficulty it has been proposed heretofore to use water resisting adhesives on tapes of this kind, but it has proved to be an extremely difficult matter to devise a machine for successfully applying such tapes to cartons. So far as I am aware no machine is commercially available at the present time for this purpose.

The present invention deals especially with these conditions. It aims to devise a thoroughly practical machine for applying to cartons reenforcing or sealing tapes coated with water resisting adhesives or with mixtures of water resisting and water soluble adhesives.

The nature of the invention will be readily understood from the following description when read in connection with the accompanying drawings, and the novel features will be particularly pointed out in the appended claims.

In the drawings,

Figure 1 is a perspective view of a machine for applying reenforcing tape to the abutted edges of folded cartons;

Fig. 2 is a vertical, sectional view, partly in elevation, showing certain of the more important parts of the machine illustrated in Fig. 1;

Fig. 3 is a transverse, vertical, sectional view through the conveyor of the machine shown in Fig. 1;

Fig. 4 is a sectional view approximately on the line 4—4, Fig. 2;

Fig. 5 illustrates certain details of the tape guiding mechanism;

Fig. 6 is a front elevation of the tape feeding mechanism;

Fig. 7 is a longitudinal, vertical, sectional view of a conveying mechanism differing somewhat from that shown in Figs. 2, 3 and 4;

Fig. 8 is a transverse, sectional view of the mechanism shown in Fig. 7;

Fig. 9 is a similar view through the upper part of the conveyor casing; and

Figure 10:
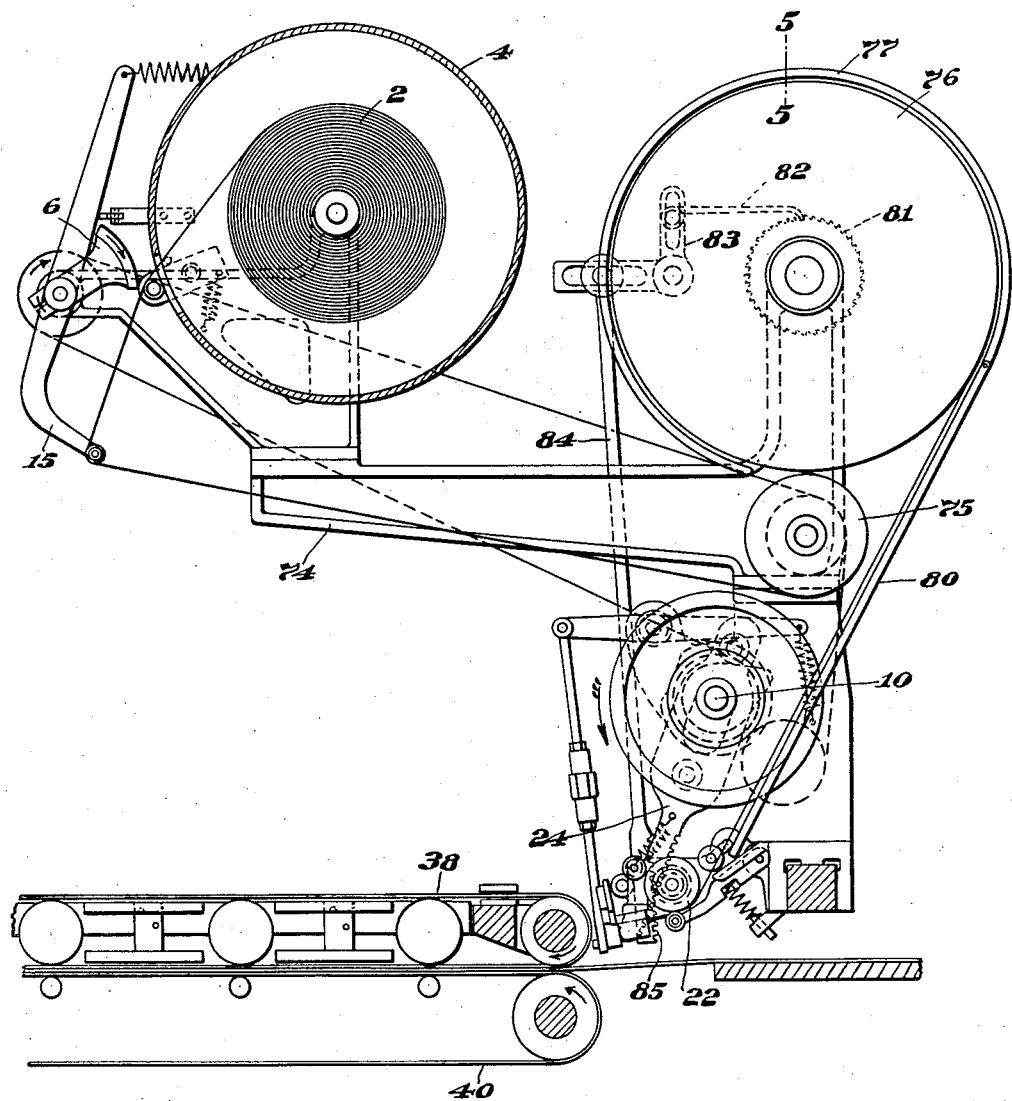
Fig. 10 is a side elevation, partly in section, illustrating a modified arrangement for feeding the tape, including means for preheating the adhesive on the tape.

It has been proposed in a related application to coat a sealing or reenforcing tape with a mixture of water soluble and waterproof adhesives, the waterproof or water resisting adhesive, however, predominating and being of such a nature that it is hard and non-tacky at normal temperatures and even at temperatures which would be regarded as high for atmospheric temperatures, such for example, as 120° F., but which will readily soften when heated to temperatures substantially above normal, as for example, 150° F. and when so softened will adhere firmly to paper, cartons, and the like. Such a mixture of adhesives facilitates the application of the tape coated with them to a carton for the reason that the initial bond between the tape and the carton can be made by moistening the adhesive and pressing the tape against the carton, and a permanent bond can be made subsequently by heating the tape sufficiently to soften the water resisting adhesive and thereby making it sticky. The machine shown in Figs. 1 to 9, inclusive, is intended more particularly for use with a tape coated with such a mixture of adhesives as that just described.

Referring first to Figs. 1, 2 and 6, it will be seen that the supply roll 2 of tape is mounted to revolve on a shaft 3 and is enclosed in a casing 4 provided at one side thereof with an outlet opening 5. The tape is drawn through this opening by means of a revolving sector 6 having a friction surface for engagement with the tape, said sector being secured on a shaft 7 which is driven by sprocket and chain connections 8, Fig. 1, from the cam shaft 10 of the machine. As the tape leaves the casing it passes over a guide roll 12 which is carried by a spring actuated lever 13, the roll serving to hold the tape in operative relationship to the sector, and assisting in gripping the tape during the feeding movement. From the roll 12 the tape passes over a takeup roll or pin 14 which is carried by a lever 15 pivoted on the shaft 7, a spring 16 being connected to the upper end of the lever to give it a yielding takeup movement. The tape next passes over stationary guide rolls 17 and 18 and thence over a moistening roller 20 which runs idly in a bath 21 of water or other moistening liquid.

The chief function of the sector 6 is to give the tape its initial feeding movement and to overcome the inertia of the roll 2. A more important part of the tape feeding operation is performed by two rolls 22, both provided with roughened surfaces for engagement with the paper and both mounted on a shaft 23 which is driven intermittently by a rack and pinion connection with a cam follower 24 arranged to be operated by the cam 25 on the cam shaft 10. A spring actuated roll 26 cooperates with the feed rolls 22 during the tape feeding movement. This feeding mechanism both draws the tape from the supply and over the moistening roll 20, and also feeds this tape forward to the point where it will come in contact with the cartons. On its way to this point the tape passes through a slotted shear blade 27 of a cutting mechanism which also includes a reciprocating blade 28, Fig. 6. This blade is connected by a link 30 with one arm of an operating lever 31, the other arm of which carries a roll 32 running on the surface of a cam 33. During each rotation of this cam a low point comes into register with the roll 32, whereupon the spring 34 swings the lever 31 in the proper direction to force the knife or cutter 28 downwardly and thus cause it to sever the tape, the knife being immediately raised again by the cam.

The machine so far described is substantially like the machine known commercially as the "S & S Carton Taping Machine". It serves to moisten the adhesive coating on the tape and to feed the tape into contact with the cartons where an additional tape feeding movement is produced by the fact that the cartons themselves pull the tape past the feed rolls 22, said rolls being ratchet driven for this purpose. When a predetermined length of tape has been fed it is cut off. The length of tape applied to each carton is predetermined by adjusting the cutter operating cam 33 on the cam shaft so that the time at which it operates can be changed at will. Since this machine is well known and is not here claimed per se, no further description of it is believed to be necessary. It should be understood, however, that other mechanisms for performing essentially the same functions can be substituted for it.

The cartons customarily are stacked in a magazine 36, Fig. 1, and are fed out of it one at a time by any suitable mechanism, as for example, by a chain 37, Fig. 1, equipped with feedings lugs. Any one of several carton feeding mechanisms well known in the industry may be used for this purpose. The cartons at this time are folded or knocked down, as above stated. A typical carton is shown in Fig. 1 at C with a strip of tape T affixed to it and uniting the abutting edges. The chain 37, or other carton feeding mechanism used, is positively connected with the cam shaft 10 of the tape feeding mechanism above described so that the carton feeding and tape handling operations take place in a definite time relationship to each other, and the forward end of the length of tape is brought into contact with the carton at the desired point just after the forward edge of the carton has been entered between, and is gripped by, upper and lower conveyor belts 38 and 40, Fig. 2. The upper of these belts runs over, and is driven by, a pulley 41 fast on a shaft 42, the opposite end of this shaft being supported on an idle pulley 43. Between these two pulleys the upper reach of this belt is supported by a series of rolls 44. The lower belt is similarly supported, the end adjacent to the tape feeding mechanism being guided on and driven by a pulley 45 carried by the shaft 46, while the opposite end is supported on an idle pulley 47. At intermediate points the upper reach of this belt is supported by small rolls 48. The shafts 42 and 46 are geared to each other and are driven from the main shaft of the machine.

It may here be pointed out that the cartons usually are considerably wider than are the belts, and in order to steady them where they project at opposite sides of the belts, the machine frame is provided with stationary side rails 50—50, Figs. 1 and 3, on which the projecting portions of the cartons slide as they are conveyed by the belts. The idle pulley 47 and the intermediate rolls 48 are mounted on side pieces supported by brackets 51 which are carried by pedestals 52. Because of the greater width of the cartons, the shafts 42 and 46 also carry upper and lower feed rolls 53 and 54 located at opposite sides of the belts and of substantially the same radii, respectively, as the upper and lower belts at the points where they pass over their driving rolls 41 and 45, respectively, so that they will assist the belts in transferring the cartons.

The lower belt may be made of leather, fabric, or other suitable material, but the upper belt 38 is made of metal or some other heat conducting material. I have used a belt made of thin spring steel similar to that used in band saws, with very satisfactory results. Means are provided for heating this belt sufficiently to cause it to soften the adhesive on the tape T after the tape has been applied to the cartons and while the cartons are being conveyed. For this purpose a series of electric heaters 56 is located between the upper and lower reaches of the belt 38, and additional heaters 57 are positioned at the opposite edges of the belt. These heaters, the rolls 44, and the pulley 47 are all mounted in and supported by a sheet metal casing 58, the outer end of which is adjustably supported by a vertical bolt 60, Fig. 1, projecting through the horizontal cross member of the end frame 61. The upper end of this bolt is provided with a collar 59 and with a nut against which the collar abuts, these parts cooperating with the bolt to support the outer end of the casing at the desired elevation. At its opposite end the casing 58 is supported on two brackets 62—62, Figs. 1 and 2, both of which are pivoted on the shaft 42. Consequently, the entire casing 58, with its belt 38 and the other parts mounted in the casing, can be swung about the axis of a shaft 42. A hand lever 63, Fig. 1, is operatively connected with the collar 59 for this purpose and is supported on a swinging fulcrum 64 so that the upper belt can be raised away from the path of travel of the cartons when desired or necessary to permit inspection or repairs. The brackets 62—62 also carry two grooved rolls, one of which is shown in Fig. 2 at 65, for engaging the opposite edges of the belt 38 and guiding it.

When this machine is in operation the cartons C are fed from the magazine 36 one at a time and are advanced successively between the belts 38 and 40. Immediately after the forward edge of a carton is gripped by the belts a length of tape with its adhesive surface moistened is fed into contact with the carton and overlapping the two abutting edges as shown at T in Fig. 1. Both the tape and the carton move forward together between the belts, the tape adhering to the carton because of the tackiness of the adhesive coating. The tape is severed at the proper point and the carton passes along between the belts, these operations being repeated substantially continuously. The upper heat conducting belt 38 is maintained at a temperature somewhat higher than the melting point of the adhesive coating on the tape. Consequently, the contact of this belt with the tape quickly dries out the moisture applied to it by the moistening roll 20 and softens the waterproof constituents of the adhesive coating sufficiently to make the entire coating sticky. At the same time the intermediate rolls 44 act through the belt 38 to press the tape firmly against the carton. Consequently, the tape becomes securely united to the carton by a union which will not thereafter be affected to any substantial degree by atmospheric moisture.

A slightly different conveyor arrangement is illustrated in Figs. 7, 8 and 9 in which larger rolls are used for supporting the metal belt so that the extreme flexing of this belt is reduced and a longer period of serviceability is realized. Referring to Fig. 7 it will be observed that the driving pulley 66 for the metal belt 38' is supported in one end of the casing 58' and is driven by gear connections with the shaft 46. The cartons C are delivered on the upper reach of the lower belt 40 in the same manner as in the construction shown in Fig. 2, and an upper feed roll 67 on the shaft 42 is provided to cooperate with the lower belt at this point to feed the cartons forward into the grip of the upper and lower belts. The space in the casing 58' between the driving and idle pulleys 66 and 68, respectively, is divided into upper and lower chambers by means of a horizontal partition 70. Electric heaters 71 in the upper chamber serve to heat the upper reach of the belt while additional heaters 72 heat the lower reach. This arrangement conserves the heat and affords better control of the temperature of the metal belt 38'.

In the event that the adhesive on the tape contains no substantial water soluble constituent, it may be advisable either to preheat the adhesive sufficiently to make it tacky before feeding it into contact with the cartons, and then to utilize the pressure exerted in the conveyor mechanism to complete the attachment of the tape to the cartons, or else to depend upon the application of additional heat to the tape as it goes through the conveying mechanism to complete the union. In other words, the adhesive on the tape can be either partly or wholly preheated, as desired. An arrangement for this purpose is shown in Fig. 10 in which the supply reel 2 and the tape feeding mechanism associated therewith is arranged substantially as in the construction above described but this whole mechanism is set over toward the left and supported on a special bracket 74. The tape drawn from the supply roll is led over a guide roll 75 and thence around the periphery of a drum 76 to the feed rolls 22. The greater part of the drum is surrounded by a casing 77 in which a continuous electric heating unit 78, Fig. 5, is embedded. The adhesively coated side of the tape is presented to the heater 78. Also, an extension 80 of this casing and heater lies immediately beside the tape extending from the point at which it leaves the drum until just before it reaches the feed roll 72. Consequently, the adhesive is raised to an elevated temperature shortly after the tape engages the drum and this temperature is maintained until the tape has reached a location closely adjacent to the point at which it comes in contact with the carton. The conveyor arrangement is like that shown in Fig. 2.

In this machine, as in that above described, the greater part of the tape feeding movement ordinarily is produced by the fact that the tape is gripped between the upper belt 38 and the carton, the tape being pulled past the roll 22 by the movement of the belts. At the beginning of each feeding movement, however, the inertia of the reel 2 and the drum 76 must be overcome. In the case of the reel this result is accomplished in the same manner as in the machine shown in Fig. 2 by driving the sector 6 from the cam shaft 10 of the machine. For the purpose of starting the rotation of the drum 78, however, the drum shaft is equipped with a ratchet wheel 81 that is engaged by a pawl 82 connected with one end of a bell crank lever 83. The opposite end of said lever is connected by a link 84 with a rack 85 which may conveniently be operated by a pinion driven by the cam follower 24. This mechanism is not depended upon to produce any extended rotative movement of the drum 76, but is utilized chiefly to initiate such movement and thus to reduce the work required of the feed rolls 22.

The application of the tape to the cartons in the machine shown in Fig. 10 is effected in much the same manner as that in the embodiments of the invention above described. In fact, the mechanical operations are exactly the same except that the tape is not moistened and the adhesive coating on it is softened sufficiently to make it sticky either when it first comes in contact with the carton or, if desired, at a subsequent period as the carton is carried through the conveying and heating mechanism.

This invention thus provides a machine for applying sealing and reinforcing tapes to cartons which can be used successfully either with tapes coated with waterproof adhesives or with mixtures of waterproof and water soluble adhesives. The machine is so organized that it affords a high rate of production, while at the same time being extremely reliable and not liable to get out of order. The changes necessary to adapt the machine for handling cartons of different sizes can be quickly and easily made.

It will also be understood that while I have herein shown and described a preferred embodiment of my invention, nevertheless the invention is susceptible of embodiment in other forms without departing from the spirit or scope thereof. For example, the particular machine shown is especially adapted for use in the manufacture of cartons, but the invention is equally applicable to carton sealing and similar operations.

Having thus described my invention, what I desire to claim as new is:

1. In a machine of the character described, the combination of mechanism for feeding cartons successively past a delivery point, means for feeding tape coated with both water soluble and water resisting adhesive toward said point and into contact with the successive cartons, means for moistening the adhesive on the tape prior to its delivery to the cartons, means for heating the adhesive on the tape after it has been so applied to the cartons to soften said water resisting adhesive and to maintain it in a soft and sticky condition for a considerable period of time, and means for pressing the tape firmly against the cartons during said period and while the adhesive is so softened to secure the tape firmly to the cartons.

2. In a machine for applying to cartons a tape coated with a water resisting adhesive, the combination of means for feeding the cartons, mechanism for applying the tape to the successive cartons, means for heating the tape prior to its application to the cartons, additional means for heating the tape after it has been so applied sufficiently to soften said adhesive and to maintain it in a soft and sticky condition for a considerable period of time, and means for pressing the tape firmly against the cartons during said period and while the adhesive is so softened to cause the tape to bond securely to the cartons.

3. In a machine for applying to cartons a tape coated with both water soluble and water resisting adhesives, the combination of means for feeding the cartons, mechanism for feeding the tape to the cartons, means for moistening the adhesive on the tape prior to coming in contact with the cartons, whereby an initial bond of the tape to each carton will be produced by said water soluble adhesive, additional means for heating the adhesive on the tape after it has been so applied sufficiently to soften said water resisting adhesive and to maintain it in a soft and sticky condition for a considerable period of time, and means for pressing the tape firmly against the cartons during said period and while the latter adhesive is so softened to bond the tape securely to the cartons.

4. In a machine of the character described, the combination of carton feeding mechanism, means for feeding adhesively coated tape into contact with successive cartons, a pair of belts between which each carton with the tape so applied thereto is delivered by said feeding mechanism with the tape in contact with one of said belts, mechanism for driving said belts to cause them to feed the cartons and means for heating the belt in contact with said tape sufficiently to soften the adhesive on the tape and cause it to bond securely to the carton, the latter of said belts being continuous and being made of metal.

5. In a machine of the character described, the combination of upper and lower belts for engaging the bottom and top, respectively, of a series of cartons and feeding them, means for driving said belts, the upper of said belts being continuous and made of metal, and electric heaters positioned closely adjacent to both the upper and lower runs of the latter belt for heating it.

6. In a machine of the character described, the combination of a support for a moving series of cartons, each carton having a strip of tape applied thereto and the tape carrying a water resistant meltable adhesive, a continuous metal belt bearing on the portions of the cartons to which said tape is applied, and means for heating said belt sufficiently to cause it to soften said adhesive.

7. In a machine for applying to cartons a tape coated with a water resisting adhesive, the combination of means for feeding the cartons, mechanism for applying the tape to the successive cartons, means for supporting a series of said cartons for movement away from the tape feeding mechanism, a metal belt for bearing on said cartons at and adjacent to the region to which said tape has been applied, mechanism for driving said belt to cause it to impart a transferring movement to said cartons, means for heating said belt to cause its contact with said cartons to soften the water resistant adhesive on the lengths of tape applied to them, and to maintain said adhesive in a soft and sticky condition while the cartons are being transferred, and means for pressing the tape firmly against the cartons while the adhesive is so softened to bond the tape securely to the cartons.

8. In a machine of the character described, the combination of a support for a series of moving cartons, a continuous flexible metal belt overlying said cartons and bearing on them, mechanism for driving said belt, and means for heating said belt.

9. In a machine of the character described, the combination of a belt for supporting a series of cartons, a continuous flexible metal belt bearing on said cartons while they are so supported, means for heating the latter belt, and mechanism for driving said belts in unison to cause them to feed said cartons.

10. In a machine for applying to cartons a tape coated with a water resisting adhesive, the combination of means for feeding the cartons, mechanism for applying the tape to the successive cartons, means for supporting a series of said cartons for movement away from the tape applying mechanism, a metal belt for bearing on said cartons at and adjacent to the region to which said tape has been applied, mechanism for driving said belt to cause it to impart a transferring movement to said cartons, means for heating both the upper and lower runs of said belt independently of each other, and a partition dividing the space between said runs into upper and lower heating chambers.

11. In a machine for applying to cartons a tape coated with a water resisting adhesive, the combination of means for feeding the cartons, mechanism for applying the tape to the successive cartons, means for supporting a series of said cartons for movement away from the tape applying mechanism, a metal belt for bearing on said cartons at and adjacent to the region to which said tape has been applied, mechanism for driving said belt to cause it to impart a transferring movement to said cartons, means for heating said belt to cause its contact with said cartons to soften the water resistant adhesive on the lengths of tape applied to them and to maintain said adhesive in a soft and sticky condition while the cartons are being transferred, and means for supporting said belt for movement out of its normal position and away from the path of travel of said cartons.

12. In a machine for applying to cartons a tape coated with a water resisting adhesive, the combination of means for feeding the cartons, mechanism for applying the tape to the successive cartons, upper and lower belts for receiving between them the cartons to which the tape has been applied and transferring said cartons, said upper belt being made of metal and bearing on the portions of the cartons at and adjacent to the region to which the tape has been applied, mechanism for driving said belts, and means for heating said upper belt to cause its contact with the cartons to soften the water resistant adhesive on the lengths of tape applied to them and to maintain said adhesive in a soft and sticky condition while the cartons are being transferred.

WILLIAM W. McLAURIN.